UNITED STATES PATENT OFFICE.

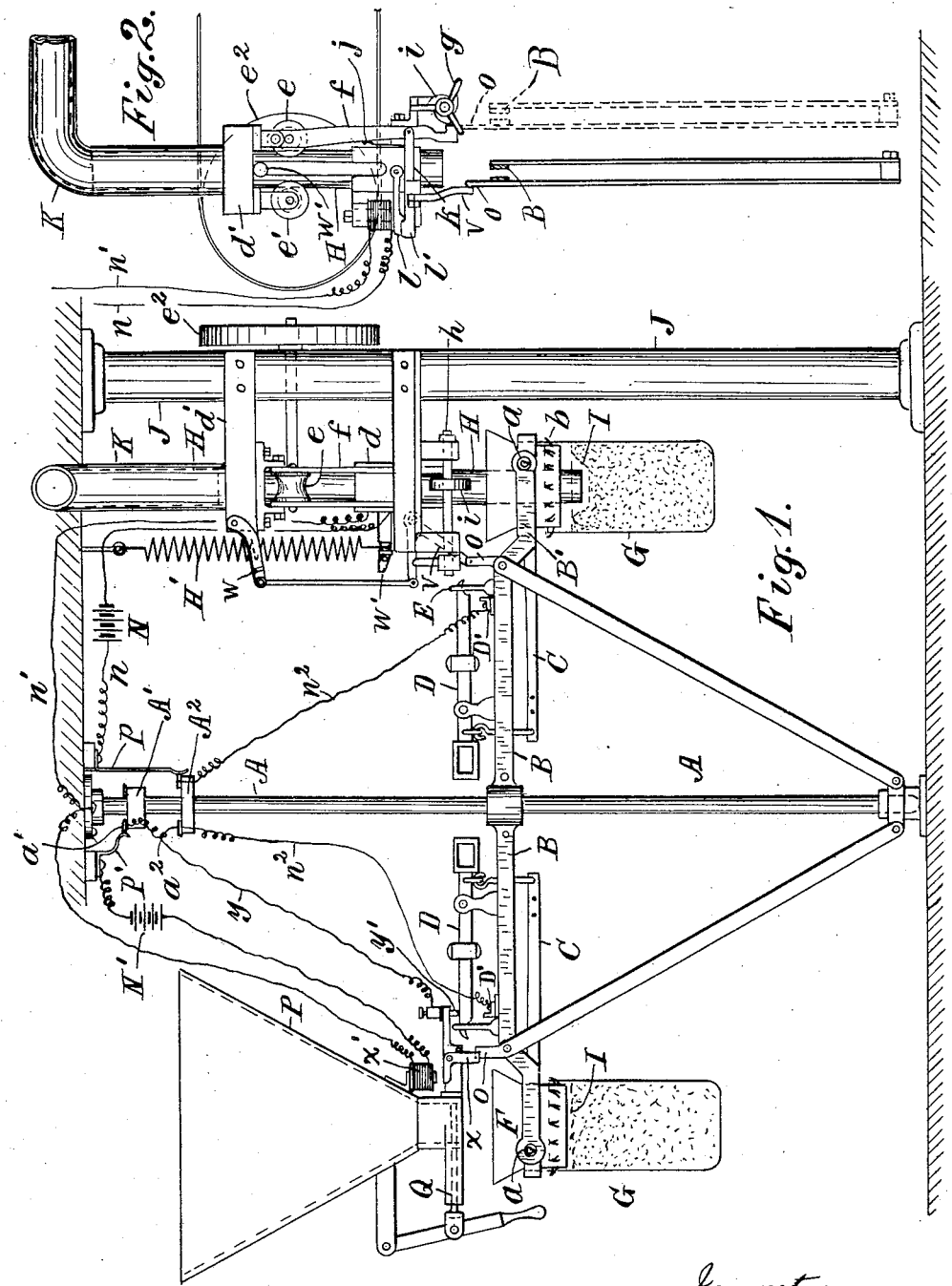

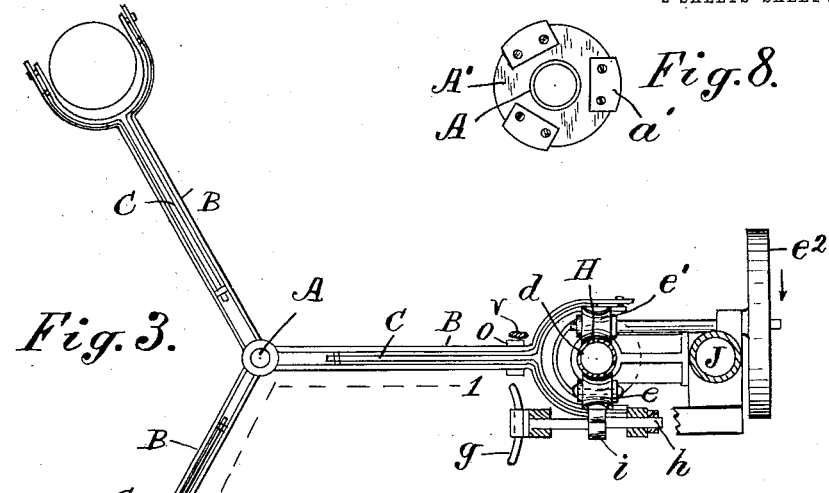
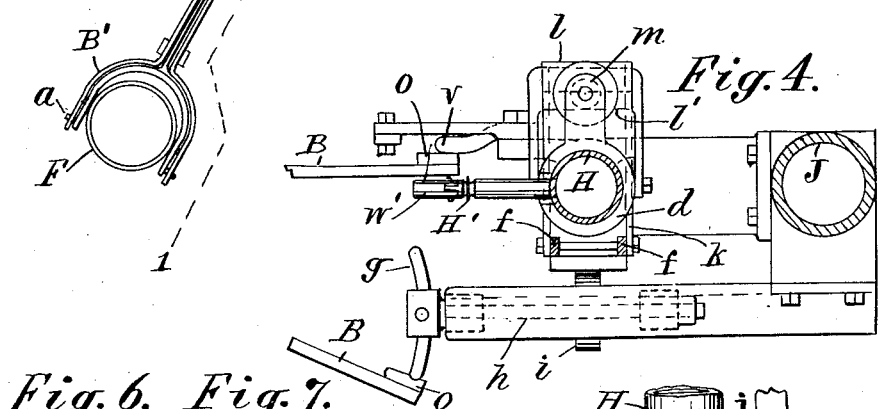
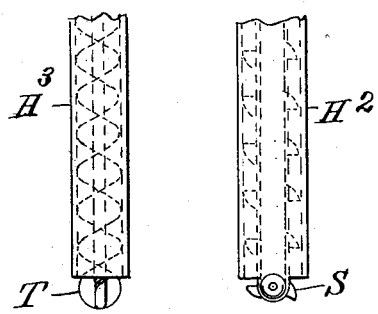
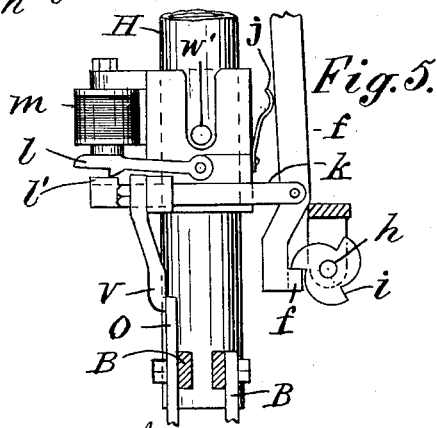

JOHN P. CURRY, OF NEW YORK, N. Y.

APPARATUS FOR AUTOMATICALLY REGULATING WEIGHT.

1,081,723.  Specification of Letters Patent.  Patented Dec. 16, 1913.

Application filed February 27, 1912.  Serial No. 680,312.

*To all whom it may concern:*

Be it known that I, JOHN P. CURRY, a citizen of the United States, residing at 62 West Eighty-ninth street, New York city, county of New York, and State of New York, have invented certain new and useful Improvements in Apparatus for Automatically Regulating Weight, fully described and represented in the following specification and the accompanying drawings, forming a part of the same.

This invention relates to a means for filling a package with a definite weight of material, and this is effected in the present invention by employing a suitable extractor, as a current of air, a screw-propeller, or a bucket-conveyer to lift the surplus from an overcharge of material in the package, while the package is supported upon a scale. Such extractor, with the means for moving it and the filled package in relation to one another, constitutes an "equalizer" for equalizing the weight in a series of packages. The weighing operation is made automatic so as to avoid hand-labor, by making the package and extractor movable in relation to one another, and providing mechanism actuated, as the package is placed beneath the equalizer, to move the extractor or the package so as to bring the extractor into operation upon the surface of the material, and providing automatic means for separating the extractor and the material, which means is actuated by the movement of the scale-beam when the weight is adjusted. Electrical connections are preferably employed to initiate the operation of the extractor, and to separate it from the material, at the beginning and close of the weighing operation. To effect the weighing most rapidly, it is desirable that the scale with the package thereon shall be made movable, so that the package may be filled with an overcharge (which would be indicated by the scale) and then moved beneath the equalizer, a stop being provided to properly locate the package thereunder. As the package is thus placed in position to have its weight adjusted, a contact of a part connected with the movable scale initiates the movement of the extractor and package in relation to one another, and removes the surplus of the material. It is obviously immaterial to the operation of the extractor whether the package be stationary and the extractor-tube moved into it, or the extractor-tube be stationary and the package be raised to bring the extracting agent into operation, as the effect in removing the surplus material is precisely the same. When the weight is adjusted in the package the scale-beam falls, the movement of which beam is utilized to close an electric circuit and instantly arrest the operation of the extractor, and bring into action the means for retracting the extractor from the package. The movement of the extractor from the package also operates to remove the stop from the path of the movable scale, and the scale with the weighted package may then be moved away from the extractor, and such movement operates to bring another scale and overcharged package into the same relation to the extractor.

The invention is illustrated in connection with a three-armed weighing apparatus mounted upon a vertical shaft, with a scale or weighing device upon each of the arms, and a suitable support connected to the scale for sustaining the package during the weighing operation; but it is immaterial what means be provided for placing the package under the extractor. Where the scale is movable between a filling device and one for finally adjusting the weight, it is preferable that a stop should control the movements of the package from one to the other so that its movement will be prevented if it is filled with less than an overcharge. This is effected by having a stop adjacent to the position where the package is filled, and electrical devices controlled by the movement of the scale or scale-beam (when the package contains an overcharge) to withdraw the stop from the movement of the package and permit its transfer to the adjusting device. If a scale movable with a package be employed, the extractor is mounted over the path of the packages, and the devices for starting and stopping the operation of the extractor would be also arranged in the path of suitable studs or dogs carried by the movable scale, so as to be actuated thereby automatically.

In the drawing, Figure 1 is a side elevation taken on the dotted line 1—1 in Fig. 3; Fig. 2 is a side view of the extractor with the means for operating the same with the parts B, B² also shown in dotted lines in a separate position. Fig. 3 is a plan of the apparatus; Fig. 4 is a plan of the means for locking the moving driver to the extractor-tube, showing the latch in engagement with the magnetic lock; Fig. 5 is an elevation showing the latch disengaged from the magnetic lock; Fig. 6 shows the lower end of an extractor-tube having a spiral conveyer therein; and Fig. 7 shows the lower end of an extractor-tube having a bucket-conveyer therein, and Fig. 8 is a plan of the electrical post contacts or commutators.

A carrier for three scales is shown provided with a central post A, and three braced carrier-arms B projected therefrom and provided with forks B' at the ends having holes in which the primary scale-pivots $a$ are fitted. The primary scale-lever C is forked to carry such pivots and, as shown in Fig. 1, its arm is extended toward the post A and connected with a scale-beam D, the free end of which is movable in a slotted guide E which is insulated upon the carrier-arm B. A contact D' is mounted adjacent to the guide E. A funnel F is shown pivoted by knife-edges in the fork of the primary lever C, and provided with hooks $b$ (see Fig. 1) upon which a bag G may be hung. Such a bag is shown in section in Fig. 1 beneath an extractor-tube H, the lower end of which is extended into the material I in the bag. The extractor-tube is movable vertically in bearings $d$, $d'$, upon a post J, its upper end being fitted within a vacuum-pipe K by which a draft of air is constantly induced at the lower end of the extractor. A spring H' draws the tube normally upward. Rolls $e$, $e'$ are shown applied to opposite sides of the tube near the bearing $d$, the axle of the roll $e$ being stationary and provided with a driving-pulley $e^2$ to rotate it continuously, and the roll $e$ journaled upon a lever $f$ which is automatically moved, to press the rolls together, by a dog $o$ projected upwardly from one of the carrier-arms B. The dog operates upon the prongs $g$ of a three-armed spider attached to a cam-shaft $h$, which bears a cam $i$ having three teeth adapted to press upon the lower end of the lever $f$. In Fig. 2, one of the arms B is shown with the dog $o$ thereon passing beneath the end of the shaft $h$ and pressing one of the fingers $g$ so as to turn one of the cam-teeth against the lower end of the lever $f$, and thus press the rolls $e$, $e'$ together, which causes the rotation of the roll $e$ to feed the extractor-tube slowly downward. Links $k$ connect the lever $f$ with a latch-bar $l$, arranged to automatically engage a tooth $l'$ upon the links when the cam presses upon the lever $f$, and before the dog $o$ finishes its movement in contact with the finger $g$. Such final movement of the dog turns the cam, as shown in Fig. 5, past the seat upon the lever $f$ so as to clear the said seat, thus leaving the lever $f$ free to move whenever the latch-bar is withdrawn. This is effected when the weight is adjusted, by the action of the magnet $m'$. A spring $j$ is provided to thus move the lever, and an electric circuit having wires $n$, $n'$ is connected with the magnet, and the circuit closed at the proper time through the scale-beam D and the contact D'. Such electric circuit is by the commutator A² brought into connection successively with each of the scale-beams of the several scales, as they move with the package into position beneath the extractor-tube. Such connection is effected by a stationary spring $p$ connected with the generator N by a wire $n$, and arranged to bear successively upon three contacts $a^2$ attached to an insulating block A² upon the post A, and connected respectively by wires $n^2$ with the contacts D' upon the several carrier-arms B. The block and contacts $a^2$ form a commutator. The wires $n'$ from the generator H are connected to the post A itself, and thus in electrical connection with all the scale-beams D. When the package is overcharged, and the free end of the scale-beam is lifted, the electric circuit of the magnet $m$ is open, but when the weight is adjusted by the extractor the scale-beam falls and closes the circuit by contact with the contact D'. This actuates the magnet $m$ and instantly lifts the latch-bar, thus permitting the spring $j$ to release the driving means from the extractor-tube and allowing the extractor-tube to retract.

A hinged stop $v$ is shown fixed in the path of the dog $o$ upon the arm B to arrest each arm as the package reaches a point beneath the extractor, and a trip-lever is connected to the stop and carries a pin $w$ in the path of a hinged finger $w'$ which is movable with the extractor-tube, by which the retraction of the extractor-tube from the package lifts the stop temporarily and thus permits the rotation of the carrying-arms B to bring another scale and package into proximity to the extractor. Any other mechanism may be used for shifting the stop. The trip-lever is hinged at a higher level than the pin $w$, so that the latter swings clear of the finger $w'$ in the final ascent of the finger; which permits the stop $v$ to immediately drop, and thus operate to arrest the succeeding dog $o$ before the extractor is again depressed. The finger $w'$ is hinged to move past the pin $w$ in such succeeding descent of the extractor.

It is obvious that mechanism may be employed to rotate the arms $b$ successively into the desired position, but this forms no part of the present invention and is not, therefore, shown herein.

Fig. 2 shows the arm B in two positions beneath the extracting devices. In the first position it is moved nearly into line with the extractor H, and the dog o is shown near the close of its operation upon the prong g, by which the driver-pulley e' is engaged with the extractor-tube. The downward movement of the extractor is thus begun just before the package is centrally below the tube, and the operation of extracting the surplus from the package is thus commenced without any delay when the stop v arrests the scale and package, as shown in the second position with the stop and dog o in contact.

Fig. 6 shows an extractor-tube $H^2$ with a bucket-conveyer S therein, and Fig. 7 shows the extractor-tube $H^3$ with a spiral conveyer t therein. Either form of extractor may be used, as they operate the same as the vacuum-lifter shown in Figs. 1 and 2, to lift the material as long as they are held in proximity or contact thereto, the material removed from the package in each case being discharged into some receptacle for storage; but such means of discharge and storage is not shown herein as it is wholly immaterial to the operation of the invention.

In Fig. 1, a hopper P having a valve Q is shown above one of the funnels F, which permits the filling of one package with an overcharge while another package is having the weight adjusted automatically beneath the extractor. If a package were filled with an undercharge, the scale-beam would rest upon the contact D' when the package was moved beneath the extractor, thus closing the circuit and releasing the lock so that the rolls e, e' would not propel the extractor-tube, and the stop v would prevent any further movement of the scales and packages. To prevent such an undercharge when the package is filled, I provide a hinged electrical stop x operated in conjunction with the dog o to prevent the movement of the package away from the hopper until it is overcharged and the scale-beam raised to its upper position, as shown adjacent to the hopper. A commutator A' is shown upon the post A to connect a circuit from a generator N' through a magnet x' which draws the stop x clear from the dog o. The contacts are connected by a wire y with a pin y' which the scale-beam D touches when raised by an overcharge in the package, thus closing a circuit through a magnet x' to retract the stop. With this arrangement, it is obvious that by constructing the scale movable with the package beneath the extractor, the weight of the packages may be adjusted with much greater rapidity than if a stationary scale were fixed beneath the extractor and the packages filled thereon.

A rotary weighing apparatus carrying a series of arms with scales, such as is shown in Fig. 1, has been heretofore used by manipulating the valve Q carefully to supply the package with the exact amount desired, by reference to the scale; but my invention provides a means which has never been used before in connection with such movable scales, for exactly adjusting the weight of material in each package automatically, rather than manually. It is immaterial by what means the scales be supported with the packages for carrying them successively to the extractor to have their contents equalized in weight, and I have therefore claimed such means irrespective of the particular construction. In such a combination of moving scales with an extractor, it is exceedingly desirable that the extractor should enter the package automatically as soon as the scale and package are in the desired position, and the drawing shows this effected by the contact of the dog o with the prongs g which actuate the driver for the extractor-tube; but any other suitable means may be substituted for such dog and driving means, without departing from the spirit of the invention. It is immaterial to the other parts of the invention what extracting mechanism be employed to remove the surplus material from the package, and I have therefore claimed means for equalizing the weight of the packages, in connection with the means for moving the scale with the package into an operative relation to such equalizing means.

It is immaterial what locking device be used for holding in operation the means for propelling the tube until the weight in the package is equalized, as the invention is essentially a method of adjusting the weight in a package, by moving an extractor-tube and package in relation to one another.

Where a vacuum-tube is used, the tube does not actually come in contact with the material, but constantly produces a current of air from the surface of the material into the tube which scoops out the material around the nozzle of the tube as is clearly indicated by the dotted line I in Fig. 1.

In the drawing, the locking device for the extractor is shown as a latch l, combined with a magnet to produce a disengagement of the parts when the weight in the package is equalized, but any other suitable means may be used to control this movement, or to operate the lock v (if one be used) to bring the scale and package to rest beneath the extractor.

Having thus set forth the nature of the invention what is claimed herein is:

1. An apparatus for weighing a definite weight of material in a package, comprising a filling hopper, and an equalizer having means to remove surplus material from a package, a scale with means to move it with the package from the hopper to the equalizer, and means operated as the package is located beneath the equalizer for actuating the means to remove surplus material from the package.

2. An apparatus for weighing a definite weight of material in a package, comprising a filling hopper and an equalizer having an extractor adapted to remove surplus material from the package, a scale with means to move it with the package from the hopper to the equalizer and means for automatically moving the extractor and package in relation to one another to remove the surplus material from the package.

3. An apparatus for weighing a definite weight of material in a package, comprising an equalizer having means to remove surplus material from a package, a scale with means to move it with the package into operative position beneath the equalizer, a movable stop for arresting the scale with the package in such operative position, means operated as the scale approaches the stop for actuating the means to remove the surplus material, and means actuated by the movement of the scale-beam when the weight of the package is adjusted, for arresting the operation of the extractor and retracting the stop to permit the further movement of the scale.

4. An apparatus for weighing a definite weight of material in a package, comprising a filling hopper and an equalizer having means to remove surplus material from the package, a scale with means to move it with the package from the hopper to the equalizer, a movable stop for arresting the scale with the package beneath the equalizer, means operated as the scale approaches the stop for actuating the means to remove the surplus material, and means actuated by the movement of the scale-beam when the weight of the package is adjusted, for arresting the operation of the extracting means and retracting the stop to permit the further movement of the scale.

5. An apparatus for weighing a definite weight of material in a removable package, comprising a scale with means to sustain the same movably beneath an extractor-tube, a package supported removably upon the scale, an extractor-tube movable vertically over the package, means for propelling the extractor-tube into the package, and means operating as the scale and package are moved beneath the extractor-tube for actuating the propelling means to move the tube into the package.

6. An apparatus for weighing a definite weight of material in a removable package, comprising a scale with means to sustain the same with the package movably, an extractor-tube sustained above the path of the package, a movable stop to arrest the package beneath the extractor-tube, means for propelling the extractor-tube into the package, means operating as the scale and package are moved beneath the extractor-tube for actuating the propelling means, and means operating when the weight is adjusted, for releasing the stop.

7. An apparatus for weighing a definite weight of material in a removable package, comprising a scale, a package supported removably upon the scale, an extractor-tube movable into and out of the package, a continuously moving driver for the extractor-tube, means for engaging the driver with the tube, means to retract the extractor-tube from the package, and means actuated by the movement of the scale-beam, when the weight is adjusted, to arrest the propelling mechanism and actuate the retracting mechanism.

8. An apparatus for weighing a definite weight of material in a removable package, comprising a scale with means to sustain the same with the package movably, an extractor-tube sustained above the path of the package, a continuously moving driver for the extractor-tube, a spring to retract the extractor-tube from the package, means operating as the scale and package are moved beneath the extractor-tube, for engaging the driver with the tube, and means actuated by the movement of the scale-beam, when the weight is adjusted, to disengage the driver and permit the spring to retract the extractor-tube.

9. An apparatus for weighing a definite weight of material, comprising a scale movable beneath an extractor-tube, a package supported removably upon the scale, an extractor-tube with driving means for moving it into and out of the package, a locking device to hold the driving means in operation upon the extractor-tube, and a magnet with circuit actuated by the scale-beam when the weight of the package is adjusted, for releasing the driving means from the extractor-tube and permitting its retraction.

10. An apparatus for weighing a definite weight of material, comprising a scale, a package supported removably upon the scale, an extractor-tube movable into and out of the package, a continuously moving driver for the extractor-tube, means for engaging the driver with the tube to propel the same, a locking device operating upon such means to hold the driver in such engagement, a magnet to operate the locking device, and an electric circuit with contact operated by the scale-beam, for actuating such locking device, to release the extractor-tube from the driver when the weight is adjusted.

11. An apparatus for removing the surplus material from an overfilled package, comprising an extractor, a scale sustained beneath the extractor, a package supported upon the scale, means for shifting the extractor and the package in relation to one another to extract the surplus material from the package, and means operating when the overfilled package is in its operative position for actuating such shifting means and removing the surplus material from the package.

In testimony whereof I have hereunto set my hand in the presence of two subscribing witnesses.

JOHN P. CURRY.

Witnesses:
L. LEE,
THOMAS S. CRANE.

Copies of this patent may be obtained for five cents each, by addressing the "Commissioner of Patents, Washington, D. C."